United States Patent [19]
Lejeune

[11] 3,779,301
[45] Dec. 18, 1973

[54] MOUNTING OF VERY LARGE TIRES

[75] Inventor: Daniel Lejeune, Clermont-Ferrand, France

[73] Assignee: Compagnie Generale Des Etablissements Michelin raison sociale Michelin & Cie, Clermont-Ferrand (Puy-de-dome), France

[22] Filed: July 21, 1972

[21] Appl. No.: 273,721

[30] Foreign Application Priority Data
Aug. 2, 1971 France .............................. 7128338

[52] U.S. Cl. .............................. 157/1.17, 157/1.1
[51] Int. Cl. ............................................ B60c 25/06
[58] Field of Search ....................... 157/1, 1.1, 1.11, 157/1.17; 29/200 D, 273; 144/288 A

[56] References Cited
UNITED STATES PATENTS

| 1,511,463 | 10/1924 | Griffith | 29/273 |
| 2,775,289 | 12/1956 | Anderson | 157/1.17 X |
| 2,743,767 | 5/1956 | Martin | 157/1 |

*Primary Examiner*—Donald G. Kelly
*Assistant Examiner*—Harold P. Smith, Jr.
*Attorney*—Granville M. Brumbaugh et al.

[57] ABSTRACT

In order to facilitate mounting or removing a very large tire on or from a cylindrical rim, a slide beam is fastened at one end to the rim edge in such a manner that the beam is included within a cylinder forming an extension of the base of the rim and is tangent to such cylinder along a generatrix. Auxiliary beams are similarly mounted at intervals of 120° around the rim.

6 Claims, 3 Drawing Figures

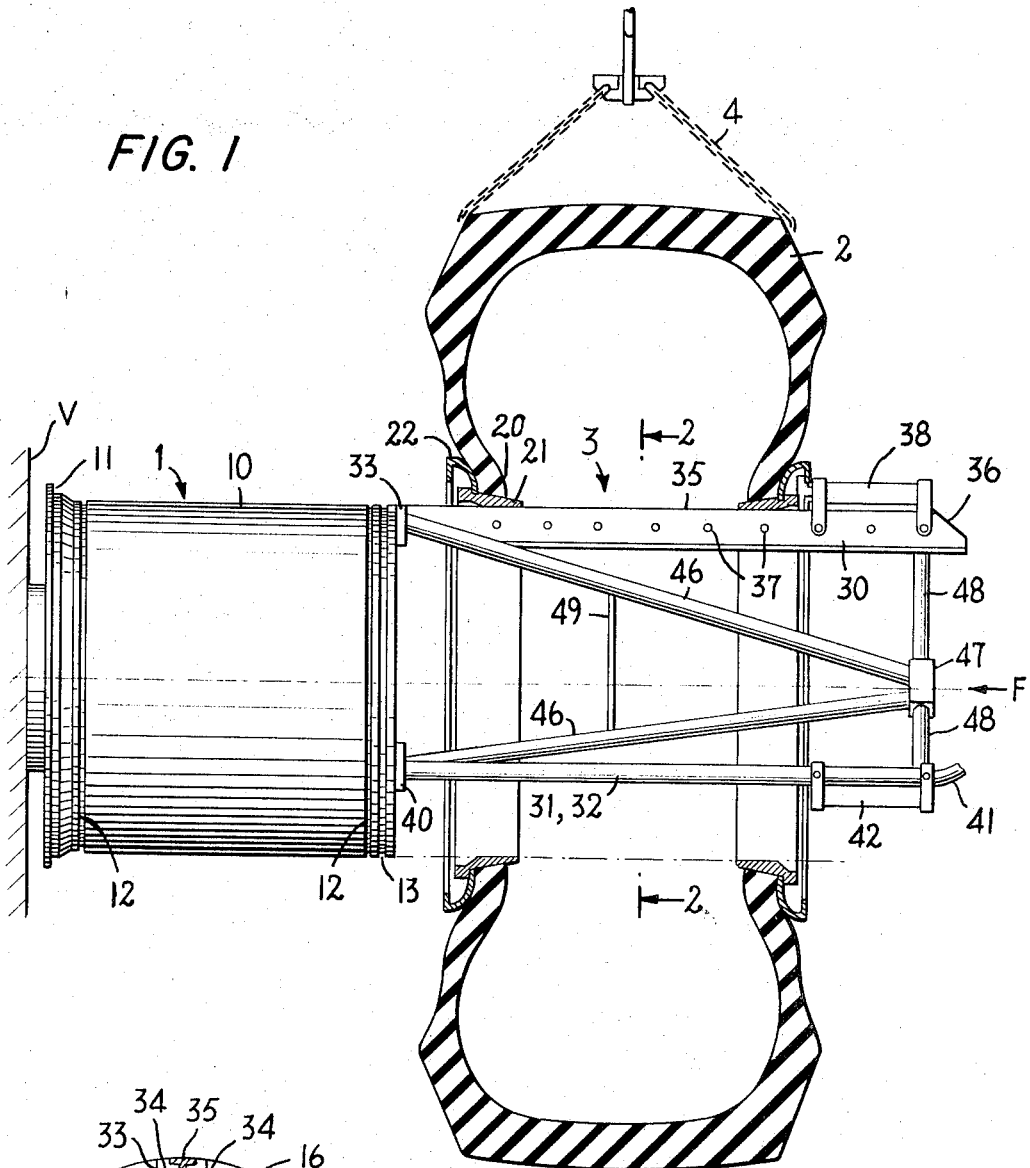
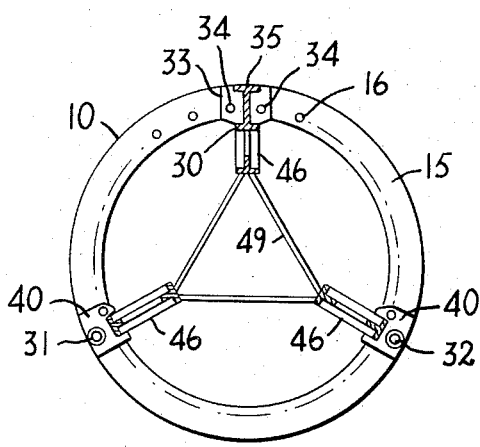
PATENTED DEC 18 1973                                              3,779,301
FIG. 1
FIG. 2
FIG. 3

3,779,301

MOUNTING OF VERY LARGE TIRES

BACKGROUND OF THE INVENTION

This invention relates to the mounting of tires and, more particularly, to a novel and highly effective method and apparatus facilitating the mounting of tires of very large size, such as those used on construction vehicles.

Tires of very large size are used intensively, under very severe operating conditions, so that replacement must be effected relatively frequently. The removal and mounting for replacement must furthermore usually be effected at the place of use itself. These operations generally require hours and tie up an expensive vehicle for a period of time that may amount to an entire day and even longer. The long time required for replacement is due, of course, to the heavy weight of the tires and the very small difference in diameter between the contacting parts of the tire and the rim. Up to the present time, no well-designed special apparatus has existed for mounting and unmounting giant tires, and it has been necessary to use inadequate, unspecialized lifting and handling apparatus.

SUMMARY OF THE INVENTION

A primary object of the present invention is to cure this drawback and, in particular, to provide a mounting apparatus and method suitable for the mounting and removal of very heavy tires that are fitted with only a slight tolerance on cylindrical rims, thus making possible a relatively rapid change of tire, effected at the place of use itself.

The foregoing and other objects are attained in accordance with the invention by the provision of a supporting slide beam provided at one of its ends with means for attachment to the rim, the section of the beam and the means of attachment being such that the beam, once it has been fastened to the rim, is included within the cylinder forming an extension of the base of the rim and is tangent to such cylinder along a generatrix.

Preferably, the apparatus in accordance with the invention furthermore has the following features:

a. The apparatus comprises, in addition to the main supporting beam, two auxiliary beams which are connected to the main beam and may also be fastened to the rim, these auxiliary beams being included, in the same manner as the main beam, within the cylinder forming the extension of the base of the rim and being tangent to such cylinder along generatrices.

These auxiliary beams have a twofold purpose: they serve to strengthen the main beam and therefore assist in supporting the weight of the tire without deformation; they also serve to guide the tire in its movement of translation. The connection between the main beam and the auxiliary beams may advantageously be effected by means of a pyramid-shaped tripod the legs of which are fastened to one of the ends of each of the beams and the vertex of which is connected by radial arms to the other end of each of the beams.

b. The main beam and/or the auxiliary beams are provided at their free end with an incline permitting progressive centering of the tire on the axis of the rim.

c. The main beam and/or the auxiliary beams have a plurality of locations for attaching jacks, in particular hydraulic jacks capable of exerting a thrust or an axial traction on the tire, whatever the position of the tire, either on the rim or on the supporting beam.

The method in accordance with the invention for the mounting or removal of a tire on the rim of a vehicle is characterized by fastening to the rim a main supporting beam in such a manner that the upper edge of the beam forms an extension of the upper generatrix of the cylinder forming the rim base, auxiliary beams being possibly used and being also fastened in the extension of other generatrices; by effecting the axial sliding of the tire from the rim onto the supporting beam, or vice versa, with possible guidance by the auxiliary beams; and by disengaging or engaging the tire, as the case may be, from or with the free end of the supporting beam.

The invention thus comprises extending the rim by means of a supporting assembly serving as slide, the assembly constituting, so to speak, a schematized rim on which it is easier to mount or remove a tire by means of ordinary handling devices.

BRIEF DESCRIPTION OF THE DRAWING

An understanding of other aspects of the invention can be gained from a consideration of the following detailed description of the preferred embodiments thereof, in conjunction with the appended figures of the drawing, wherein:

FIG. 1 is a view in elevation of apparatus according to the invention fastened to a rim and bearing a tire, shown in radial section;

FIG. 2 is a sectional view of the apparatus along the line 2—2 of FIG. 1, looking in the direction of the arrows; and FIG. 3 is an axial view of the apparatus in the direction indicated by the arrow F in FIG. 1.

DESCRIPTION OF THE PREFERRED EMBODIMENT

FIG. 1 shows a rim 1 connected to a vehicle V. The rim 1 has a cylindrical portion 10 forming the rim base, an annular abutment 11 forming the inner side flange, annular grooves 12 forming a recess for packing rings (not shown), and an annular groove 13 intended to receive an outer removable locking ring, the removable locking ring having been removed and not being shown in the drawing. The rim 1 comprises an annular flange 15 provided with holes 16 for attachment to the hub by means of lugs securely attached to the hub and nuts (not shown). On the periphery of the disk 15 there are 40 holes 16 and fasteners uniformly distributed.

FIG. 1 furthermore shows a tire 2 which is still suspended by a sling 4 from a hoisting device (not shown). The beads 20 of the tire 2 are wedged onto bead seats 21 and lateral rings 22 fastened permanently on the tire.

FIG. 1 finally shows the mounting apparatus 3 of the invention, shown bearing the tire 2.

The apparatus 3 comprises a main beam 30 of I-shaped cross-section and two tubular auxiliary beams 31 and 32. The beam 30 is provided at one of its ends with a coupling 33 pierced by two holes 34 the distance between which corresponds to the distance between two holes 16 on the rim disk. The coupling 33 thus makes it possible to fasten the beam 30 to the rim 1, making use of the studs and nuts for the fastening of the rim 1 to the vehicle.

In FIG. 1, the beam 30 is shown with its upper face 35 along the extension of the upper generatrix of the rim base 10. The beam 30 has been fastened to the rim by aligning the two holes 34 with the two holes 16 of the rim which are at the top.

The beam 30 is terminated by a portion 36 forming an incline for access to the edge 35. This serves to guide and center the tire when it is mounted on the apparatus 3.

The beam 30 is provided at regular intervals with holes 37 permitting the attachment, by means of pins (not shown), of a hydraulic jack 38 which can exert a pull or axial thrust on the tire by engagement on the bead seat 21 or the side ring 22.

The auxiliary beams 31 and 32 are arranged in a manner similar to the main beam 30. As FIG. 2 shows, they are tangent on the inside to the cylinder 10 forming the outer surface of the rim base. They furthermore have a coupling 40 at one of their ends, the coupling having a hole similar to the holes 16 for engagement with the studs that fasten the rim 1 to the hub. They also have, at the other end, a portion 41 which is curved in the direction towards the axis to facilitate mounting the tire on the apparatus 3. Finally, like the beam 30, they can receive jacks 42 and 43 which are similar to the jack 38 and operate in the same manner.

The beams 30, 31 and 32 are connected to each other by a tripod formed of three arms 46 connected at one of their ends to the beams 30, 31 and 32 and connected to each other at their other ends by a coupling 47 which in its turn is connected by radial arms 48 to the beams 30, 31, 32. An intermediate stiffener 49 of triangular shape contributes to the strength of the tripod.

The operation of the apparatus will be easily understood. The vehicle is immobilized and jacked up, the tire 2 is deflated if necessary, and the removable locking ring of the rim is removed. The beams 30, 31, 32 are fastened on the rim, the beam 30 being secured by using the pins which pass through the two topmost holes 16. By means of the jacks 38, 42 and 43 arranged at suitable positions on the beams 30, 31, 32, the tire 2 located on the rim 1 is removed. When the tire 2 rests entirely on the beam 30, the sling 4 can be passed around it and a conventional hoisting and handling apparatus employed to remove the tire 2 from the apparatus 3. A new tire is then suspended from the sling 4. The incline 36 on the beam 30 and the inclines 41 on the beams 31 and 32 permit the centering of the tire, while the jacks 38, 42, 43 exert traction on the tire 2 in the direction of the rim. It is readily possible to place the tire 2 rapidly on the apparatus 3 and from there on the rim 1, making use of the jacks 38, 42, 43, operated simultaneously and repositioned as necessary.

Tests have shown that tires weighing several tons and having an axial passage the diameter of which is only a few millimeters larger than the diameter of the rim can be mounted and removed rapidly.

The drawings show only one embodiment of the invention, and details of execution can be modified without going beyond the scope of the invention. In particular, the beam 30 can be longer than the beams 31 and 32; and the latter can be arranged also at distances other than 120° apart around the axis of the apparatus. Moreover, the stiffening of the assembly can be assured otherwise than by means of a tripod, etc. The invention is therefore to be construed as including all the embodiments thereof within the scope of the appended claims.

I claim:

1. Apparatus for mounting or removing a tire on or from a cylindrical base rim, comprising a supporting slide beam and means for fastening one end of the slide beam to the rim, the cross section of the beam and the fastening means being such that the beam when fastened to the rim is included within a cylinder forming an extension of the base of the rim and is tangent to such cylinder along a generatrix.

2. Apparatus according to claim 1 further comprising a pair of auxiliary beams connected to the slide beam and means for fastening the auxiliary beams to the rim, the cross section of the auxiliary beams and the means fastening the auxiliary beams to the rim being such that the auxiliary beams are included within the cylinder forming an extension of the base of the rim and are tangent to such cylinder along generatrices.

3. Apparatus according to claim 1 wherein the slide beam is formed at its free end with a portion forming an incline facilitating centering of a tire being mounted thereon.

4. Apparatus according to claim 1 wherein the slide beam is formed with means for receiving jacks by which an axial traction can be exerted on the tire.

5. A method of mounting or removing a tire on or from a cylindrical base rim, comprising the steps of fastening a supporting slide beam to the rim in such a manner that the upper surface of the beam is in the extension of the upper generatrix of the cylinder forming the rim base and effecting an axial sliding of the tire from one to the other of said rim and slide beam.

6. A method according to claim 5 further comprising the step of fastening auxiliary beams to the rim in such a manner that the auxiliary beams are included within the cylinder forming an extension of the base of the rim and are tangent to such cylinder along generatrices.

* * * * *